United States Patent [19]
Koike

[11] 4,370,832
[45] Feb. 1, 1983

[54] WEATHERSTRIP FOR VEHICLE CLOSURE

[75] Inventor: Shouichi Koike, Tokyo, Japan

[73] Assignee: Nissan Motor Co., Ltd., No. 2, Yokohama, Japan

[21] Appl. No.: 286,230

[22] Filed: Jul. 23, 1981

[30] Foreign Application Priority Data

Aug. 27, 1980 [JP] Japan .................. 55-118705

[51] Int. Cl.³ .............................................. E06B 7/16
[52] U.S. Cl. ........................................ 49/488; 49/496
[58] Field of Search ............... 219/488, 485, 490, 491, 219/496, 475, 493, 501, 502; 296/146

[56] References Cited

U.S. PATENT DOCUMENTS

| | | | |
|---|---|---|---|
| 3,513,595 | 5/1970 | Mills | 49/462 |
| 3,531,897 | 10/1970 | Weimar | 49/496 X |
| 3,641,707 | 2/1972 | Kello | 49/488 X |

FOREIGN PATENT DOCUMENTS

| | | | |
|---|---|---|---|
| 727929 | 2/1966 | Canada | 49/488 |
| 2930850 | 2/1981 | Fed. Rep. of Germany | |
| 2454391 | 11/1980 | France | |
| 873939 | 8/1961 | United Kingdom | |
| 1085484 | 10/1967 | United Kingdom | 49/475 |
| 1180644 | 2/1970 | United Kingdom | 49/496 |

*Primary Examiner*—Philip C. Kannan
*Attorney, Agent, or Firm*—James C. Wray

[57] ABSTRACT

In accordance with the present invention, a new and improved center weatherstrip is provided.

The weatherstrip comprises a resilient base portion of a substantially L-shaped section, a resilient lip portion and a substantially rigid core member embedded in the base portion. The weatherstrip enables to attain a refined appearance as well as an assured seal for a vehicle body.

6 Claims, 4 Drawing Figures

WEATHERSTRIP FOR VEHICLE CLOSURE

BACKGROUND OF THE INVENTION

1. Field of the Invention

The present invention relates in general to weatherstrips for vehicle closures and more particularly to a so-called center weatherstrip for providing a seal between a front door window and a rear quarter window of a 2-door hardtop model or between a front door window and a rear door window of a 4-door hardtop model.

2. Description of the Prior Art

FIG. 2 shows, by way of example, a typical center weatherstrip 10 for use in a 2-door hardtop model. With additional reference to FIG. 1, the center weatherstrip 10 is mounted on the vehicle body at a location between a window glass panel 12 of a front door 14 and a rear quarter window glass panel 16 and includes a center sash 18 and a resilient strip 20. The center sash 18 is cemented to the front end portion 16a of the rear quarter window glass panel 16. The resilient strip 20 is in part fitted in the center sash 18 and includes a lip portion 20a sealingly engageable with the rear end portion 12a of the front door window glass panel 12.

The center weatherstrip 10 has the following disadvantages. That is, the center sash 18 has a substantially H-shaped section with respect to a horizontal plane and is constructed to receive on a first side thereof the rear quarter window glass panel 16 and on the other side thereof part of the resilient strip 20. Due to this center sash 18, the interval Lo between the front door window glass panel 12 and the rear quarter window glass panel 16 inevitably becomes large, resulting in the deteriorated appearance. Furthermore, the center sash 18 needs to have a considerable width Ho. This tends to result in a defective seal between the upper end portion of the rear quarter window glass panel 16 and a body side weatherstrip (not shown) mounted on a vehicle body roof side portion B due to the considerable difference in thickness between a part having the center sash and a part having no center sash of the upper end portion of the rear quater window glass panel. Still furthermore, since the center sash 18 is exposed to viewer, it needs to have a refined appearance, inevitably requiring an expensive material such as stainless steel or plated steel sheet and therefore resulting in an expensive cost.

In order to solve the foregoing problems, various efforts have heretofore been made, but no center weatherstrip has been proposed in the art until now which is constructed to overcome the foregoing problems without deteriorating the practical usefulness. For example, it was considered to reduce the width Ho of the center sash 18. However, this inevitably makes the base portion 20b of the resilient strip 20 too weak or too flexible, disabling the lip portion 20a from being urged against the front door window glass panel 12 with a predetermined strength. It was also considered to reduce the interval Lo by reducing the interval $L_1$. However, this results in the requirement that the front door window glass panel 12 or the rear quarter window glass panel 16 slide so acruately along a predetermined locus as to permit substantially no deviation therefrom. Due to production variations such as caused in mounting a regulator (not shown) to the front door 14 or to a vehicle body rear quarter panel portion 22, it is practically impossible to meet the requirement.

SUMMARY OF THE INVENTION

In accordance with the present invention, there is provided a new and improved weatherstrip for providing a seal between first and second movable window glass panels of an automotive vehicle.

The weatherstrip of this invention comprises a resilient base portion having two legs adapted to engage at the interior surfaces thereof a marginal interior surface portion and a peripheral end surface portion of the first window glass panel, respectively, a resilient lip portion integral with and extending from the base portion toward the second window glass panel and self-biased with its resilience toward the second window glass panel so that it is sealingly engageable with a marginal interior surface portion of the second window glass panel, and a substantially rigid core member embedded in the base portion and being of a substantially L-shaped section having two legs substantially parallel to the interior surfaces of the legs of the base portion, respectively, the legs of the base portion being cemented at the interior surfaces thereof to the marginal interior surface portion and the peripheral end surface portion of the first window glass panel, respectively.

With the above structure, it is enabled to dispense with the foregoing center sash. It is further enabled to overcome the foregoing problems inherent in the prior art center weatherstrip without deteriorating the practical usefulness.

It is accordingly an object of the present invention to provide a novel and improved center weatherstrip which enables to attain a refined appearance as well as an assured seal for a vehicle body.

BRIEF DESCRIPTION OF THE DRAWINGS

The features and advantages of the weatherstrip according to the present invention will become more clearly appreciated from the following description taken in conjunction with the accompanying drawings, in which.

DESCRIPTION OF THE PREFERRED EMBODIMENT

Figure 1:
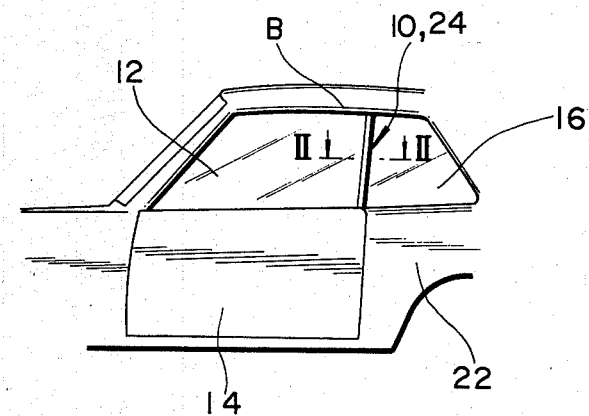
FIG. 1 is a side elevation of a 2-door hardtop model and shows a body portion at which a center weatherstrip is to be applied.
Figure 3:
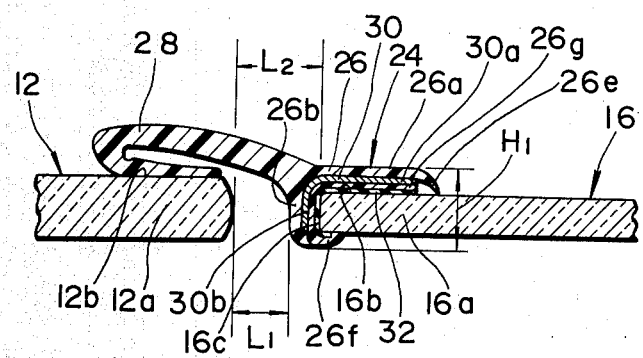
FIG. 3 is a similar view to FIG. 2 but shows a center weatherstrip embodying the present invention.
Figure 4:
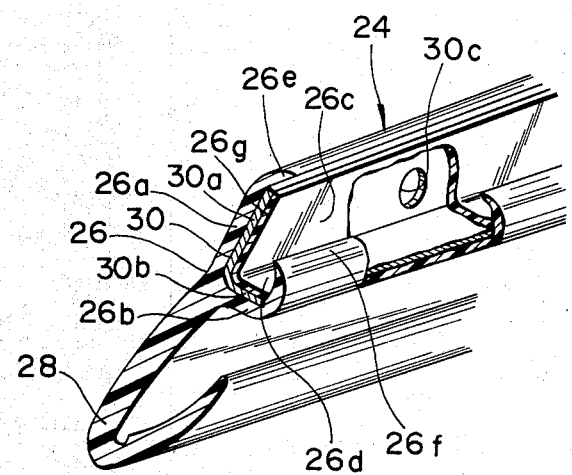
FIG. 4 is a fragmentary, partly sectional, perspective view of the weatherstrip of FIG. 3.

Referring to FIGS. 1, 3 and 4, inclusive, a center weatherstrip according to an embodiment of the present invention is generally designated at 24 and mainly consists of a resilient base portion 26, a resilient lip portion 28 and a substantially rigid core member 30.

The base portion 26 has, with respect to a horizontal sectional plane, a substantially L-shaped section including two legs 26a, 26b adapted to engage at the inside surfaces 26c, 26d thereof a marginal interior surface portion 16b and a peripheral end surface portion 16c of a rear quarter window glass panel 16, respectively. The legs 26a, 26b of the base portion 26 have lip-like free ends 26e, 26f resectively engaging the interior and exterior surfaces of the rear quarter window glass panel 16.

The lip portion 28 is integral with and extends from the corner portion of the base portion 26 toward a front door window glass panel 12. The lip portion 28 has a substantially J-shaped section with respect to a horizontal sectional plane and is self-biased with its resilience toward a marginal interior surface portion 12b of the front door window glass panel 12 so that the lip portion 28 is sealingly engageable with the marginal interior surface portion 12b of the rear end 12a of the front door window glass panel 12 when the front door glass panel 12 and the rear quarter window glass panel 16 are put into the closed positions thereof.

The core member 30 embedded in the base portion 26 has, with respect to a horizontal sectional plane, a substantially L-shaped section having two legs 30a, 30b substantially parallel to the interior surfaces 26c, 26d of the legs 26a, 26b of the base portion 26. While the base portion 26 and the lip portion 28 are integrally formed from a resilient material such as rubber or sufficiently flexible, soft synthetic resin, the core member 30 is formed from a substantially rigid or stiffly resilient hard material such as steel sheet. The core member 30 is inserted integrally with the base portion 26 upon moulding of the base portion 26 and the lip portion 28. To prevent the separation from the base portion 26, the core member 30 is formed with one or a plurality of suitable through holes 30c (see FIG. 4).

The core member 30 is embedded in the base portion 26 in such a manner that the legs 30a, 30b are substantially parallel to the inside surfaces 26c, 26d of the legs 26a, 26b of the base portion 26 or substantially parallel to the marginal interior surface portion 16b and the peripheral end surface portion 16c of the rear quarter window glass panel 16, that is, the base portion 26 includes a layer of wall 26g which contains the inside surface 26c, 26d of the base portion 26 and extends along the core member 30, which layer of wall 26g is substantially uniform in thickness.

The legs 26a, 26b of the base portion 26 is cemented or bonded at the inside surfaces 26c, 26d thereof to the marginal interior surface portion 16b and the peripheral end surface portion 16c of the rear quarter window glass panel 16, respectively by using an adhesive 32 which has the same color as the base portion 26 and the lip portion 28 (usually, the base portion and the lip portion have a blackish color).

The weatherstrip 24 is manufactured by the conventional moulding operation such as an injection moulding. In installation of the weatherstrip 24, the adhesive 32 is first applied to either of the inside surfaces 26c, 26d of the base portion 26 or the surface portions 16b, 16c of the rear quarter window glass panel 16, or to the both of same. The weatherstrip 24 is then placed on the front end portion 16a of the rear quarter window glass panel 16 and fixedly attached in position thereto, being pushed at the legs 26a, 26b of the base portion 26 against the window glass panel end portion 16a.

In the installation of the weatherstrip 24, it is important to take care that no air holes are substantially produced between the base portion 26 and the rear quarter window glass panel 16 since should such air holes be produced, an undesirable spotty appearance will result, inevitably deteriorating the aesthetic appearance of the vehicle. In this connection, the core member 30 is quite contributive to preventing the production of the air holes and thereby making the installation of the weatherstrip 24 easy. That is, the weatherstrip 24 is constructed so that the base portion 26 does not flex easily due to the provision of the core member 30. This makes it quite easy to push the base portion 28 uniformly against the rear quarter window glass panel 16. By so pushing the base portion 26, the air holes can be easily eliminated. The uniform thickness of the layer of wall 26g of the base portion 26 is also contributive to this end, that is, to allowing the inside surfaces 26c, 26d of the base portion 26 to be urged with a substantially uniform strength against the rear quarter window glass panel 16.

The lip-like free ends 26e, 26f of the legs 26a, 26b of the base portion 26 serve to prevent the adhesive 32 from protruding from between the base portion 26 and the rear quarter window glass panel 16, thus enabling to dispense with the operation for wiping off the protruded adhesive after the installation of the weatherstrip and to thereby improve the efficiency of the installation work.

Figure 2:
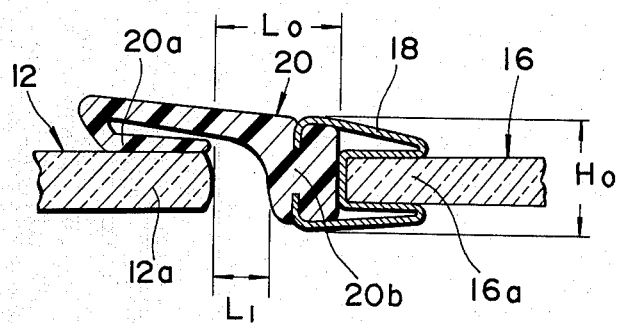
FIG. 2 is a sectional view taken along line II—II of FIG. 1 and shows a prior art center weatherstrip.

From the foregoing, it should be apparent that according to the present invention the interval $L_2$ between the front door window glass panel 12 and the rear quarter window glass panel 16 is considerably reduced as compared to the conventional interval (Lo in FIG. 2) without reducing the interval $L_1$ for permitting production variations, enabling to attain a refined appearance of the vehicle.

It should be also apparent that according to the present invention the width $H_1$ of the weatherstrip 24 is considerably reduced as compared with the conventional width (Ho in FIG. 2), enabling to attain an assured seal between the body side weatherstrip (not shown) and the upper end portion of the rear quarter window glass panel.

It should be further apparent that according to the present invention the weatherstrip 24 does not require an expensive material such as stainless steel or plated steel sheet, enabling to attain a reduced cost.

While the present invention has been described and shown as an application to a 2-door hardtop model, it is also applicable to a 4-door hardtop model or the like.

Obviously, many variations and modifications of the present invention are possible in light of the above teachings. It is, therefore, to be understood that within the scope of the appended claims, the invention may be practiced otherwise than as specifically described.

What is claimed is:

1. A weatherstrip for providing a seal between first and second movable window glass panels of an automotive vehicle, comprising:

a resilient base portion of a substantially L-shaped section having two legs adapted to engage at the interior surfaces thereof a marginal interior surface portion and a peripheral end surface portion of said first window glass panel, respectively;

a resilient lip portion integral with and extending from said base portion toward said second window glass panel and self-biased with its resilience toward said second window glass panel so that it is sealingly engageable with a marginal interior surface portion of said second window glass panel; and a substantially rigid core member embedded in said base portion and being of a substantially L-shaped section having two legs substantially parallel to the interior surfaces of said legs of said base portion, respectively;

said legs of said base portion being cemented at the interior surfaces thereof to the marginal interior surface portion and the peripheral end surface portion of said first window glass panel, respectively.

2. A weatherstrip as set fourth in claim 1, wherein said legs of said base portion comprise lip-like free ends respectively engaging the interior and exterior surfaces of said first window glass panel to prevent an adhesive used for cementing said base portion to said first window glass panel from protruding from therebetween.

3. A weatherstrip as set forth in claim 2, wherein said adhesive has substantially the same colour as that of said base portion.

4. A weatherstrip as set forth in claim 1, wherein said lip portion has a substantially J-shaped section and extends from the corner portion of said base portion.

5. A weatherstrip as set forth in claim 1, wherein said legs of said base portion comprise a layer of wall which contains said interior surfaces of said legs of said base portion and extends along said core member, said layer of wall being substantially uniform in thickness.

6. A weatherstrip as set forth in claim 1, wherein said core member comprises at least one through opening to prevent the core member from being separated from said base portion.

* * * * *